United States Patent
Seniuk

(10) Patent No.: US 10,928,587 B2
(45) Date of Patent: Feb. 23, 2021

(54) INTEGRATED OPTICAL DEVICE WITH MANUFACTURED WAVEGUIDE APERTURE TO BLOCK STRAY LIGHT AND ASSOCIATED MANUFACTURE METHOD

(71) Applicant: Ciena Corporation, Hanover, MD (US)

(72) Inventor: David Rolland Seniuk, Kanata (CA)

(73) Assignee: Ciena Corporation, Hanover, MD (US)

(*) Notice: Subject to any disclaimer, the term of this patent is extended or adjusted under 35 U.S.C. 154(b) by 0 days.

(21) Appl. No.: 16/200,878

(22) Filed: Nov. 27, 2018

(65) Prior Publication Data

US 2020/0166701 A1    May 28, 2020

(51) Int. Cl.
*G02B 6/122* (2006.01)
*G02B 6/13* (2006.01)
*G02B 6/12* (2006.01)

(52) U.S. Cl.
CPC .............. *G02B 6/122* (2013.01); *G02B 6/13* (2013.01); *G02B 2006/1204* (2013.01); *G02B 2006/12061* (2013.01); *G02B 2006/12078* (2013.01); *G02B 2006/12173* (2013.01)

(58) Field of Classification Search
CPC .......... G02B 6/136; G02B 6/13; G02B 6/122; G02B 2006/12173; G02B 2006/1204; G02B 2006/12061; G02B 2006/12069; G02B 2006/12078; G02B 2006/12166
See application file for complete search history.

(56) References Cited

U.S. PATENT DOCUMENTS

| | | | | |
|---|---|---|---|---|
| 10,559,939 | B1* | 2/2020 | Raring | H01S 5/0287 |
| 2006/0239605 | A1* | 10/2006 | Palen | G02B 6/423 |
| | | | | 385/14 |
| 2010/0027947 | A1* | 2/2010 | Dutta | G02B 6/4268 |
| | | | | 385/88 |
| 2010/0039707 | A1* | 2/2010 | Akahane | G02B 3/0012 |
| | | | | 359/576 |
| 2014/0348517 | A1* | 11/2014 | Shibata | G02B 6/43 |
| | | | | 398/214 |
| 2016/0154180 | A1* | 6/2016 | Fournier | G02B 6/12004 |
| | | | | 438/31 |
| 2019/0044066 | A1* | 2/2019 | Thomas | B82Y 10/00 |
| 2019/0123233 | A1* | 4/2019 | Usami | H01L 31/109 |

OTHER PUBLICATIONS

Ashish Dhiman, Silicon Photonics: A Review, IOSR Journal of Applied Physics (IOSR-JAP), e-ISSN: 2278-4861. vol. 3, Issue 5 (Mar.-Apr. 2013), pp. 67-79.

* cited by examiner

*Primary Examiner* — Thomas A Hollweg
*Assistant Examiner* — Mary A El-Shammaa
(74) *Attorney, Agent, or Firm* — Clements Bernard Walker; Lawrence A. Baratta, Jr.; Christopher L. Bernard

(57) ABSTRACT

A method for manufacturing a waveguide aperture to block stray light from a facet of an integrated optical device include obtaining a wafer with one or more integrated optical devices formed thereon and with a cleaved facet; positioning a mask in front of the cleaved facet, thereby masking at least a portion of the waveguide aperture of at least one the one or more integrated optical devices; and applying a light-blocking coating to the cleaved facet with the mask masking the portion of each of the one or more integrated optical devices.

15 Claims, 6 Drawing Sheets

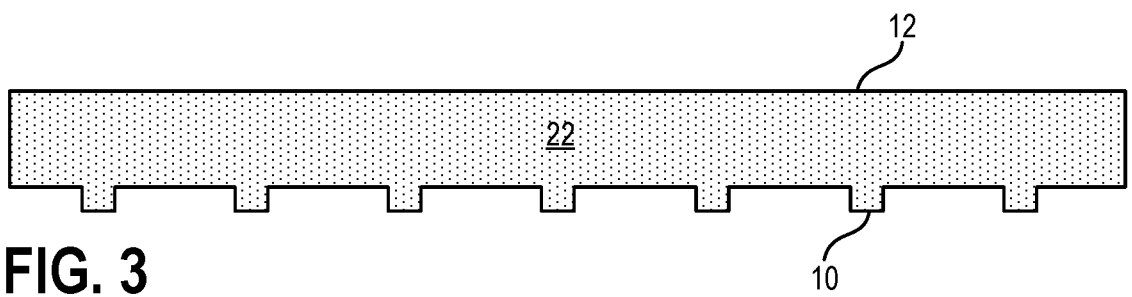
FIG. 3
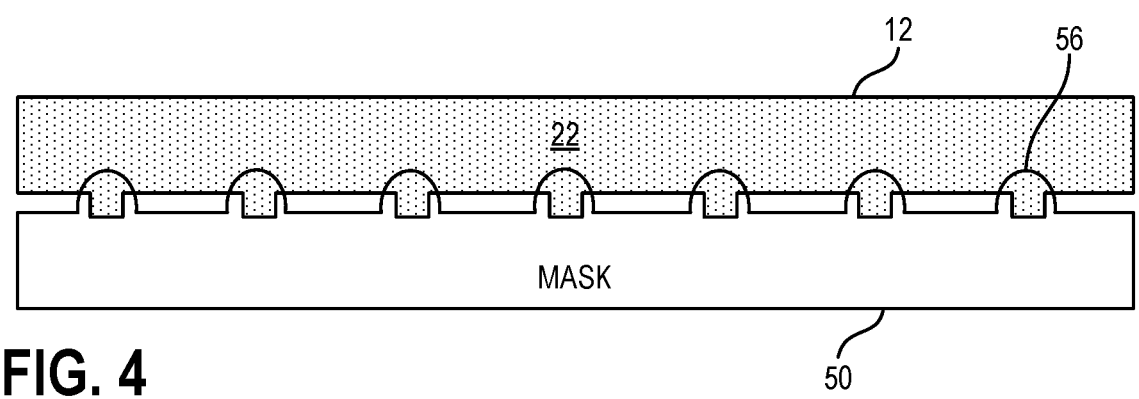
FIG. 4
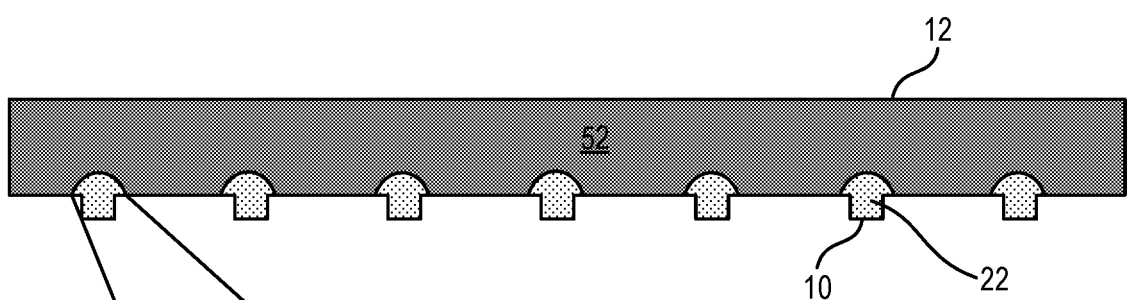
FIG. 5
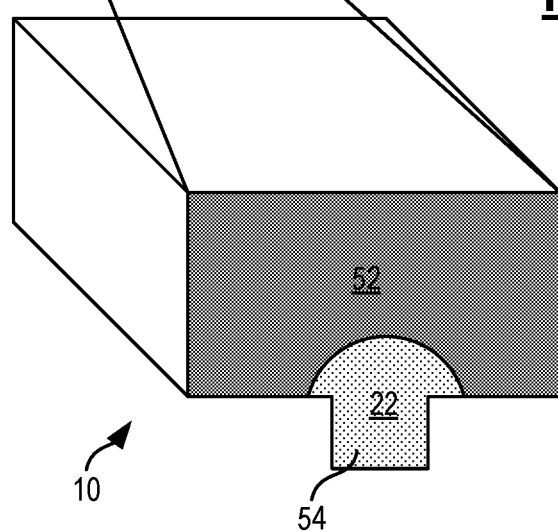

INTEGRATED OPTICAL DEVICE WITH MANUFACTURED WAVEGUIDE APERTURE TO BLOCK STRAY LIGHT AND ASSOCIATED MANUFACTURE METHOD

FIELD OF THE DISCLOSURE

The present disclosure generally relates to manufacturing of integrated optical devices. More particularly, the present disclosure relates to an integrated optical device with a manufactured waveguide aperture to block stray light and associated manufacture method.

BACKGROUND OF THE DISCLOSURE

Optical devices, namely optical waveguides, are being manufactured in an integrated manner using Indium Phosphide (InP), Silicon (Si), or other material systems to guide light. These optical devices can be referred to as Photonic Integrated Circuits (PICs), Optical Integrated Circuits (OIC), Silicon-based integrated photonics ("silicon photonics"), etc. This is in contrast to conventional, discrete components which are interconnected by fiber. In such optical devices, although optical waveguides confine most of the light coupled into it, some of the light is lost into the slab material of such optical devices, e.g., the slab material could be InP, Si, etc. Some of this stray light can escape and leave the optical device through the slab. Thus, it needs to be blocked to prevent interference or extraneous signals from being transmitted. The conventional approach includes a pinhole aperture, typically made of an Infrared (IR) blocking polymer, is glued into place to block the stray light at an output side of an optical device. Disadvantageously, the conventional approach includes a manual application of the pinhole aperture, i.e., one-by-one on each device output waveguide. The pinhole aperture must be attached using an adhesive and must be aligned to tolerances of ±10 microns which is at the microscopic level. This application requires either dexterity or robot positioning or a combination of both. Further, the adhesive used for the pinhole may be a reliability hazard. The solvents used to make the adhesive stick may allow for the vapor redeposition of materials in other areas of the singulated device or other optics in a package including the device. This vapor deposition might also degrade the optical facet prematurely. Also, it is difficult to control the flow of the adhesive and it may migrate towards the waveguide before curing. This risks destroying a fully tested and working optical device.

BRIEF SUMMARY OF THE DISCLOSURE

In an embodiment, a method for manufacturing a waveguide aperture to block stray light from a facet of an integrated optical device includes obtaining a wafer with one or more integrated optical devices formed thereon and with a cleaved facet; positioning a mask in front of the cleaved facet, thereby masking at least a portion of the waveguide aperture of at least one the one or more integrated optical devices; and applying a light-blocking coating to the cleaved facet with the mask masking the portion of each of the one or more integrated optical devices. The method can further include applying an anti-reflective coating to the cleaved facet prior to positioning the mask and applying the light-blocking coating. The method can further include singulating each of the one or more integrated optical devices subsequent to applying the light-blocking coating. The method can further include testing each of the one or more integrated optical devices on the wafer subsequent to applying the light-blocking coating and prior to singulation. Applying the light-blocking coating can utilize evaporation of a metal or a dielectric on the cleaved facet using a vacuum system for depositing. Applying the blocking coating can utilize an ion beam assisted e-beam evaporator. The wafer can be one of Indium Phosphide and Silicon, and the method can further include applying an anti-reflective coating to the cleaved facet prior to positioning the mask and applying the light-blocking coating, wherein the anti-reflective coating changes an index of refraction from the one of Indium Phosphide and Silicon to air. During the positioning, the wafer can be configured to rest on the mask with portions of the mask positioned over corresponding portions of the cleaved facet.

In another embodiment, an integrated optical device is manufactured by a process including the steps of providing a wafer with one or more integrated optical devices formed thereon and with a cleaved facet; positioning a mask in front of the cleaved facet, thereby masking at least a portion of the waveguide aperture of the integrated optical device; applying a light-blocking coating to the cleaved facet with the mask masking the portion of the integrated optical device; and singulating the wafer subsequent to applying the light-blocking coating. The process can further include the step of applying an anti-reflective coating to the cleaved facet prior to positioning the mask and applying the light-blocking coating. The process can further include the step of testing the integrated optical device on the wafer subsequent to applying the light-blocking coating and prior to singulation. Applying the light-blocking coating can utilize evaporation of a metal or a dielectric on the cleaved facet using a vacuum system for depositing. Applying the blocking coating can utilize an ion beam assisted e-beam evaporator.

The wafer can be one of Indium Phosphide and Silicon, and the process can further include the step of applying an anti-reflective coating to the cleaved facet prior to positioning the mask and applying the light-blocking coating, wherein the anti-reflective coating gradually changes an index of refraction from the one of Indium Phosphide and Silicon to air. The wafer can be configured to rest on the mask with portions of the mask positioned over corresponding portions on the cleaved facet.

In a further embodiment, an integrated optical device with a waveguide aperture to block stray light includes a semiconductor substrate crystalline slab; one or more layers on the semiconductor substrate crystalline slab forming a waveguide; a cleaved facet on an end of the semiconductor substrate crystalline slab; and a blocking coating on the cleaved facet, said blocking coating excluded on a portion of the cleaved facet at or around the waveguide aperture. The integrated optical device can further include an anti-reflective coating applied to the cleaved facet adjacent to the blocking coating. The semiconductor substrate crystalline slab can be one of Indium Phosphide and Silicon. The semiconductor substrate crystalline slab can be one of Indium Phosphide and Silicon, and wherein the anti-reflective coating gradually changes an index of refraction from the one of Indium Phosphide and Silicon to air. The light-blocking coating can be gold, or any other metal.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a diagram of a wafer with a plurality of optical devices;

FIG. 4 is a diagram of a mask for masking the facet of the wafer of FIG. 3 during application of a blocking coating;

FIG. 5 is a diagram of the wafer of FIGS. 3 and 4 with the blocking coating applied thereto and a close-up of a singulated optical device with a portion uncoated by the blocking coating due to the mask;

DETAILED DESCRIPTION OF THE DISCLOSURE

The present disclosure relates to an integrated optical device with a manufactured waveguide aperture to block stray light and associated manufacture method. Specifically, the manufactured waveguide aperture is performed in a cleaved-bar-wafer level manufacturing step performed before singulation of individual devices from the wafer, replacing the current manual step performed after singulation of devices from a wafer. The approach described herein can produce many such manufactured waveguide apertures for multiple devices during an optical facet coating run. Note, the manufactured waveguide aperture is only required on the output side of the optical device. The manufacture method includes the use of a mask which includes masks placed in front of the immediate area of a pinhole on the output side of various optical devices in a wafer. That is, the process uses self-aligning wafer level manufacturing techniques prior to device singulation (dicing) to mask pinholes on a cleaved end of a wafer in large numbers (typically 14 at a time). Advantageously, this step alleviates the manual, one-by-one application with described above.

A light-blocking coating is applied with the masks preventing application to the immediate area of the pinholes. For example, the blocking coating can be applied using an ion beam assisted e-beam evaporator. The process can be applied during facet coating which use direct line-of-sight evaporation techniques to evaporate metals and dielectrics in a high vacuum system and deposit them onto the cleaved facet. This approach utilizes deposition of materials that are as robust as the facet coating itself, and there are no solvents to outgas, avoiding adhesives described above for the manual application which can be a reliability problem. Finally, initial testing of the optical devices can be performed during wafer level manufacture with the manufactured waveguide aperture in place prior to device singulation, reducing the need to test each optical device after the optical device is singulated.

Figure 1:
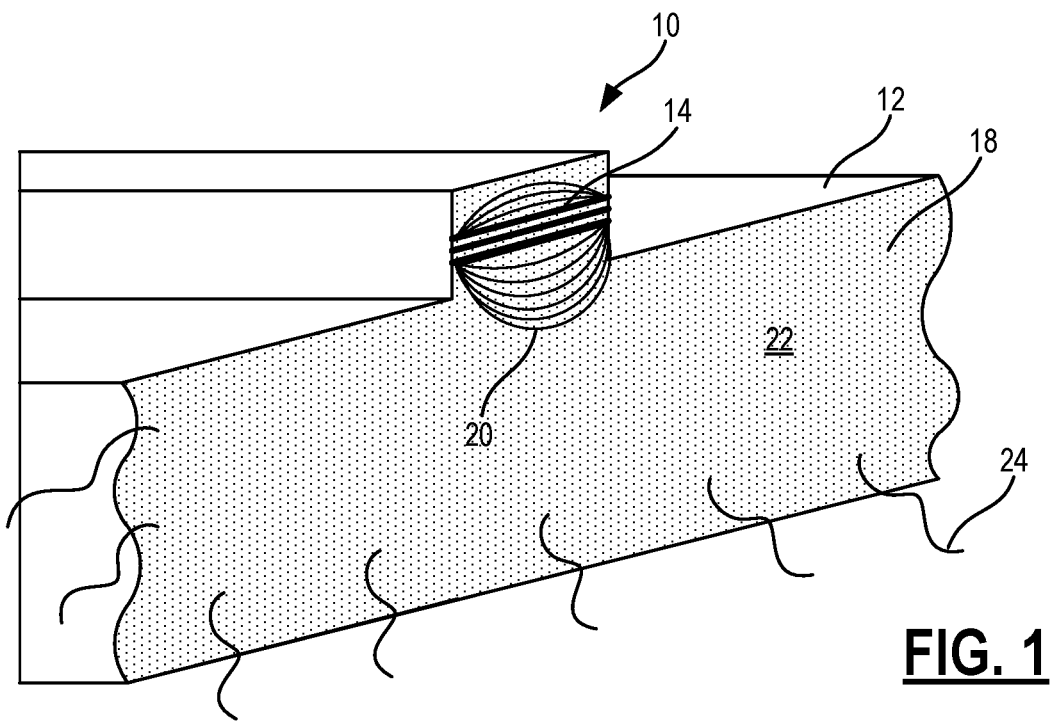
FIG. 1 is a perspective diagram of an optical device on a portion of a wafer which can include additional optical devices (not shown)

FIG. 1 is a perspective diagram of an optical device 10 on a portion of a wafer 12 which can include additional optical devices (not shown). The optical device 10 is manufactured horizontally in the wafer 12 which is a semiconductor substrate crystalline slab, such as Si, InP, GaAs, LiNbO3, etc. The optical device 10 can be an integrated optical device which includes a waveguide 14. The waveguide 14 terminates on an output side of the optical device. As described herein, the wafer 12 can simultaneously contain multiple optical devices 10, such as 14 or so, for concurrent manufacturing. Once manufactured and tested, each optical device is singulated and incorporated with other devices for operation.

During operation of the optical device 10, a guided electric field 20 (light) exits the output side through an intentionally cleaved end facet 18 in the crystal slab (wafer 12). The guided electric field 20 leaves the optical surface into the ambient air (or an adjacent device). To avoid an abrupt change in refractive index between the waveguide 14 and the air, an anti-reflective coating 22 is applied only to the cleaved facet 18. This anti-reflective coating 22 coating is applied on a group of devices 10 together, for example during wafer level manufacture of multiple devices.

Note, the various diagrams are not to scale and, practically, the optical device 10 is much smaller than the wafer 12. Again, the waveguide 14 confines the vast majority of the guided electric field 20 (e.g., 95% or more), but some stray light 24 does escape the facet 18 of the optical device 10 (e.g., 5% or less). As optical systems incorporating the optical devices 10 become more advanced, high-speed, etc., the stray light 24 does degrade performance.

Figure 2:
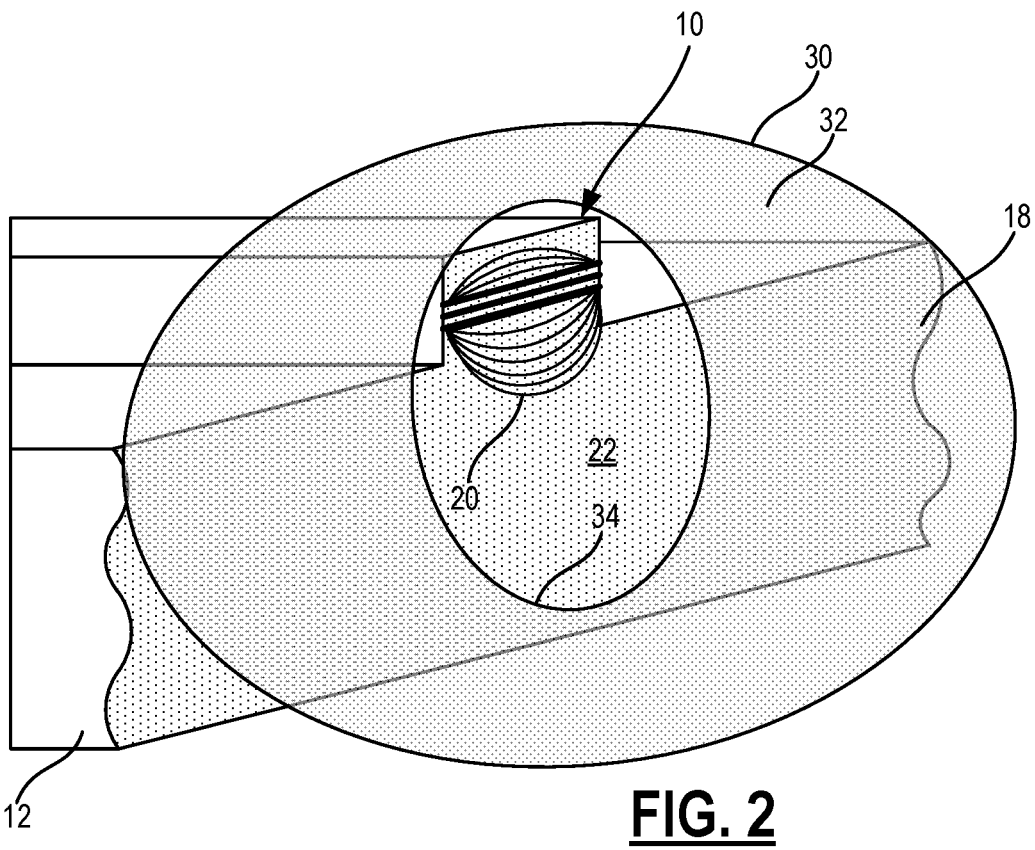
FIG. 2 is a perspective diagram of the optical device on the portion of the wafer from FIG. 1 with a pinhole aperture attached thereto.

FIG. 2 is a perspective diagram of the optical device 10 on the portion of the wafer 12 from FIG. 1 with a pinhole aperture 30 attached thereto. The pinhole aperture 30 is utilized to prevent the stray light 24 and is glued onto the output side 18, i.e., essentially gluing a flat polymer aperture 32 blocking the cleaved end facet 18 of the optical device 10 except for a pinhole 34. Although this approach helps to reduce the stray light 24 coming from the facet 18, other than the waveguide 14, it requires laborious one-by-one attachment of each pinhole aperture 30 to each singulated optical device 10, typically during the optical component packaging and assembly process. This is highly difficult to scale for volume manufacturing. Further, the pinhole aperture 30 is attached with adhesive (glue) which can limit device reliability and can cause damage to the slab of the optical device 10.

FIG. 3 is a diagram of a wafer 12 with a plurality of optical devices 10. FIG. 4 is a diagram of a mask 50 for masking the facet 18 of the wafer 12 during application of a blocking coating 52. FIG. 5 is a diagram of the wafer 12 with the blocking coating 52 applied thereto and a close-up of a singulated optical device 10 with a portion 54 uncoated by the blocking coating due to the mask 50. In an embodiment, the mask 50 can be self-aligning, i.e., have a shape which aligns to the appropriate location(s) on the wafer 12. The manufacture process described herein adds an additional step(s) in manufacturing to add the blocking coating 52 to the facet 18, as opposed to adhesively applying the pinhole aperture 30 one-by-one to the singulated optical devices 10. The advantage of this additional manufacturing step is it can be applied to a wafer bar 12 which contains multiple optical devices 10, and the blocking coating 52 is directly applied to the facet 18, avoiding adhesives, alignment issues, etc.

In FIG. 3, the wafer 12 is shown with 7 example optical devices 10 for illustration purposes. In a typical example, the wafer 12 can include 14 optical devices 10. Of course, the present disclosure contemplates any number of optical devices 10. Again, the optical devices 10 are not to scale in FIG. 3 on the wafer 12. Here, the wafer 12 has been through various manufacturing steps including, for example, depositing various layers on the wafer 12, etching or patterning to define waveguides 14, evaporating, cleaving of the facet 18, etc. Those of ordinary skill in the art recognize there can be various steps known in the art for creating the wafer 12 with the multiple optical devices 10.

The cleaved facet 18 can be at a single crystal, e.g., one atomic layer, such that the facet 18 is nearly a perfect optical face. Subsequent to the cleaving, the anti-reflective coating 22 can be applied to all of the facet 18. There can be a significant difference in the indices of refraction between the optical device 10 and the air. For example, the material in the wafer 12 can be InP, Si, GaAs, LiNbO3, etc. The anti-reflective coating 22 can be applied in various layers through evaporation to gradually change the index of refraction from the optical device 10 to the air (or other material). For example, the anti-reflective coating 22 can be applied in multiple layers (e.g., 30) using an evaporator, depositing, etc. Once applied, the guided electric field 20 can smoothly exit the waveguide 14.

In FIG. 4, a mask 50 ("shadow mask") is placed under the wafer 12 for an additional manufacturing step to add a light-blocking coating 52 to the facet 18. Again, the objective of the blocking coating 52 is to replace the functionality of the pinhole aperture 30. The manufactured wafer 12 is placed upside down on the mask 50 such that masks 56 cover each portion 54 of the optical devices 10 on the wafer 12. Here, when the blocking coating 52 is applied, the respective mask 56 blocks application of the blocking coating 52 on the portion 54. This approach produces apertures after the anti-reflective coating 22 step by subsequently masking off the waveguide 14 ends during a secondary wafer level manufacture step in which the blocking coating 52 is applied only to non-waveguide surfaces.

The mask 50 can be formed out of metal, plastic, etc. For example, the mask 50 can be stainless steel, GaAs, etc. Also, the mask 50 can be reused for multiple secondary wafer level manufacture steps, e.g., five.

Figure 6:
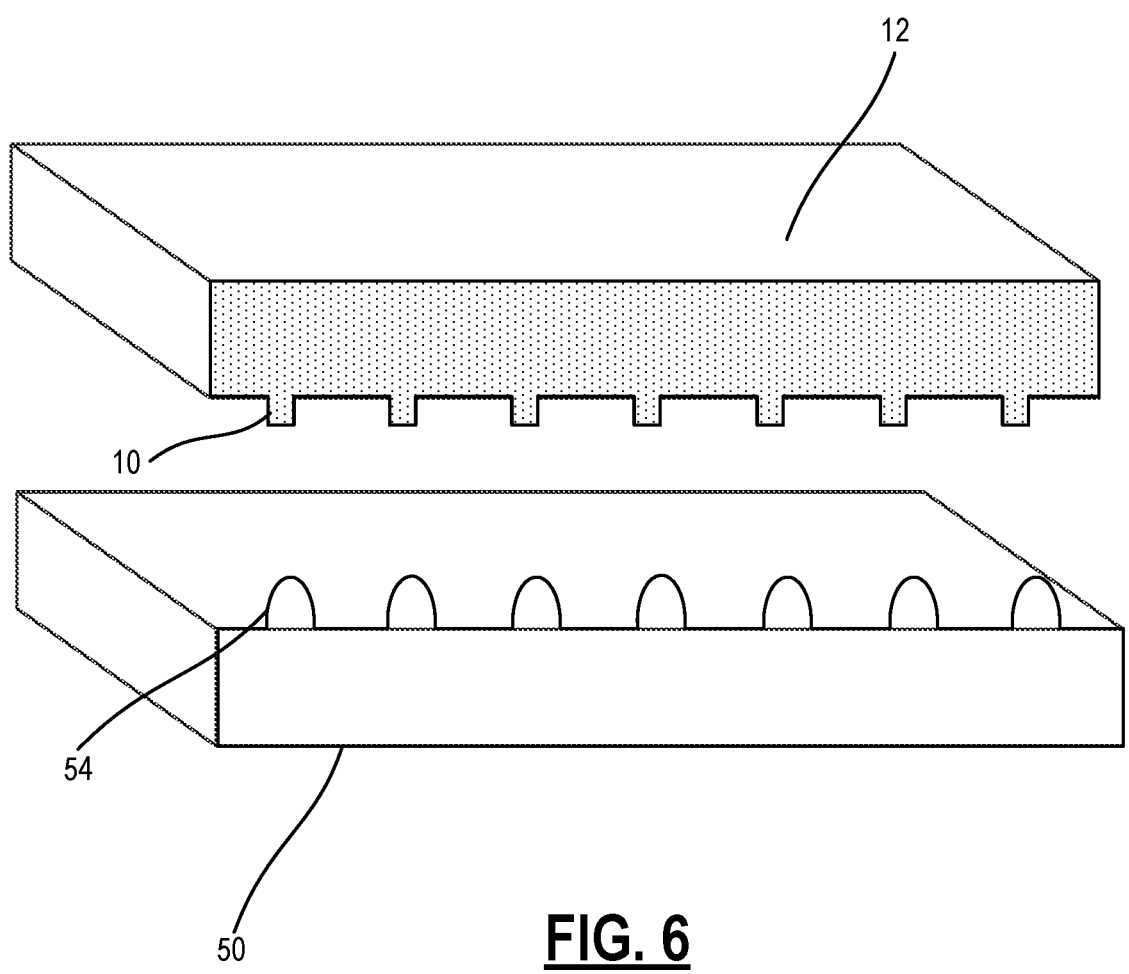
FIG. 6 is a perspective diagram of the wafer and the mask.

FIG. 6 is a perspective diagram of the wafer 12 and the mask 50. For illustration purposes, the wafer 12 and the self-aligned mask are shown in the rectangular form. Of course, other shapes are contemplated. The key is the masks 56 provide coverage over the portion 54 on the facet 18 such that when the blocking coating 52 is applied, it is not applied to the portion 54 which only has the anti-reflective coating. The mask 50 can include mechanical stops, indentations, etc. to fit the wafer 12. The key here is to avoid physical contact to the facet 18 to prevent damage. In an embodiment, the mechanical stops in the mask 50 can support the wafer 12 at an angle, e.g., 45 degrees, when placed in an evaporator.

For illustration purposes, the mask 56 (and the pinhole aperture 30) is illustrated with an oval or circular shape. Again, those of ordinary skill in the art will recognize other shapes are contemplated.

Figure 7:
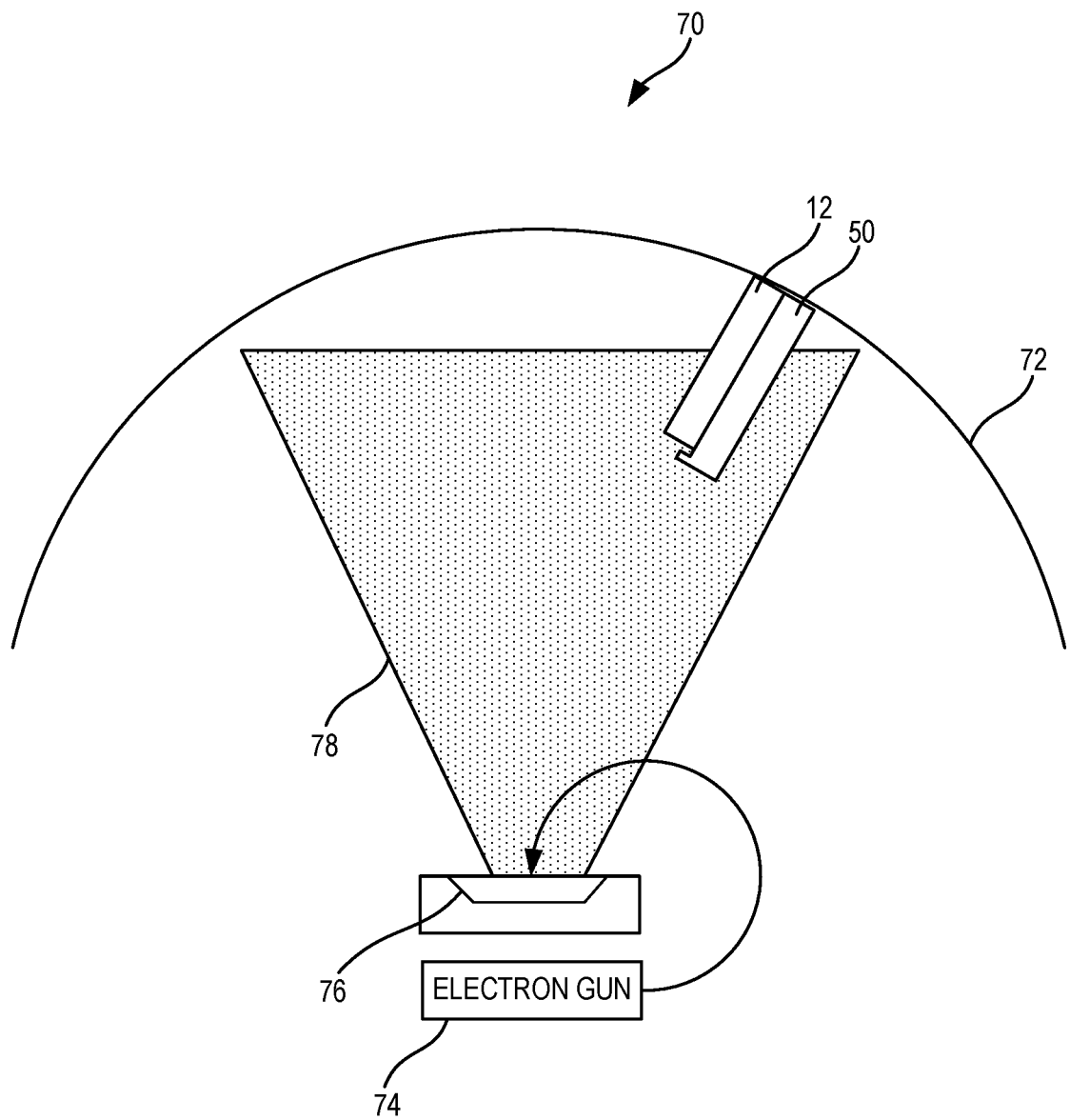
FIG. 7 is a diagram of an ion beam assisted e-beam evaporator for application of the blocking coating via Electron-beam physical vapor deposition (EBPVD)

FIG. 7 is a diagram of an ion beam assisted e-beam evaporator 70 for application of the blocking coating 52 via Electron-beam physical vapor deposition (EBPVD). For example, the evaporator 70 can include a wafer holder 72 which is illustrated holding a single wafer 12 with a corresponding mask 50. Of course, in a practical embodiment, the evaporator 70 can include multiple wafers 12 with corresponding masks 50 application of the blocking coating 52. A magnetic field is employed to direct an electron beam from a source 74 to an ingot location 76. The kinetic energy of the electrons is converted into other forms of energy through interactions with the evaporation material. The thermal energy that is produced heats up the evaporation material causing it to melt or sublimate. Once temperature and vacuum level are sufficiently high, vapor 78 results from the melt or solid. The resulting vapor 78 coats the facet 18 with the blocking coating 52.

The blocking coating 52 can be a reflective, opaque, and/or absorbing coating. In an embodiment, the blocking coating 52 can be gold and the application can be about 100 Angstroms.

Figure 8:
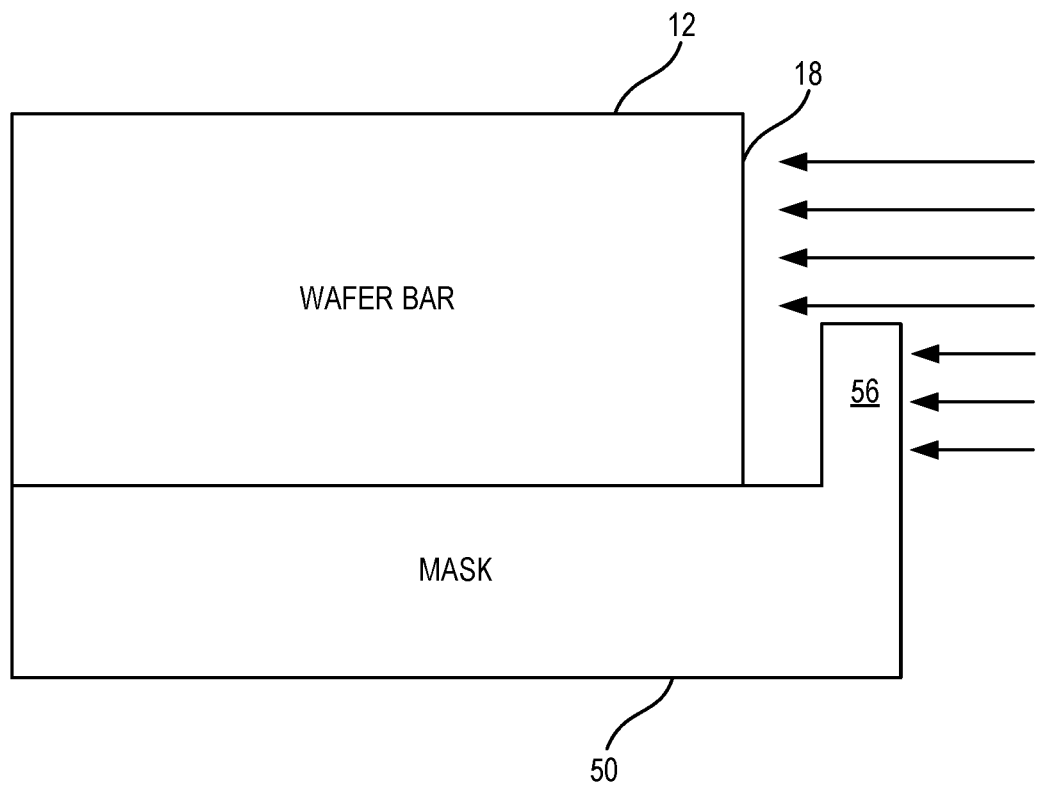
FIG. 8 is a diagram of a side view of the wafer and the corresponding mask.

FIG. 8 is a diagram of a side view of the wafer 12 bar and the corresponding mask 50. The mask 56 is used to block the application of the blocking coating 52 on the portion 54 of the facet in the evaporator 70.

Figure 9:
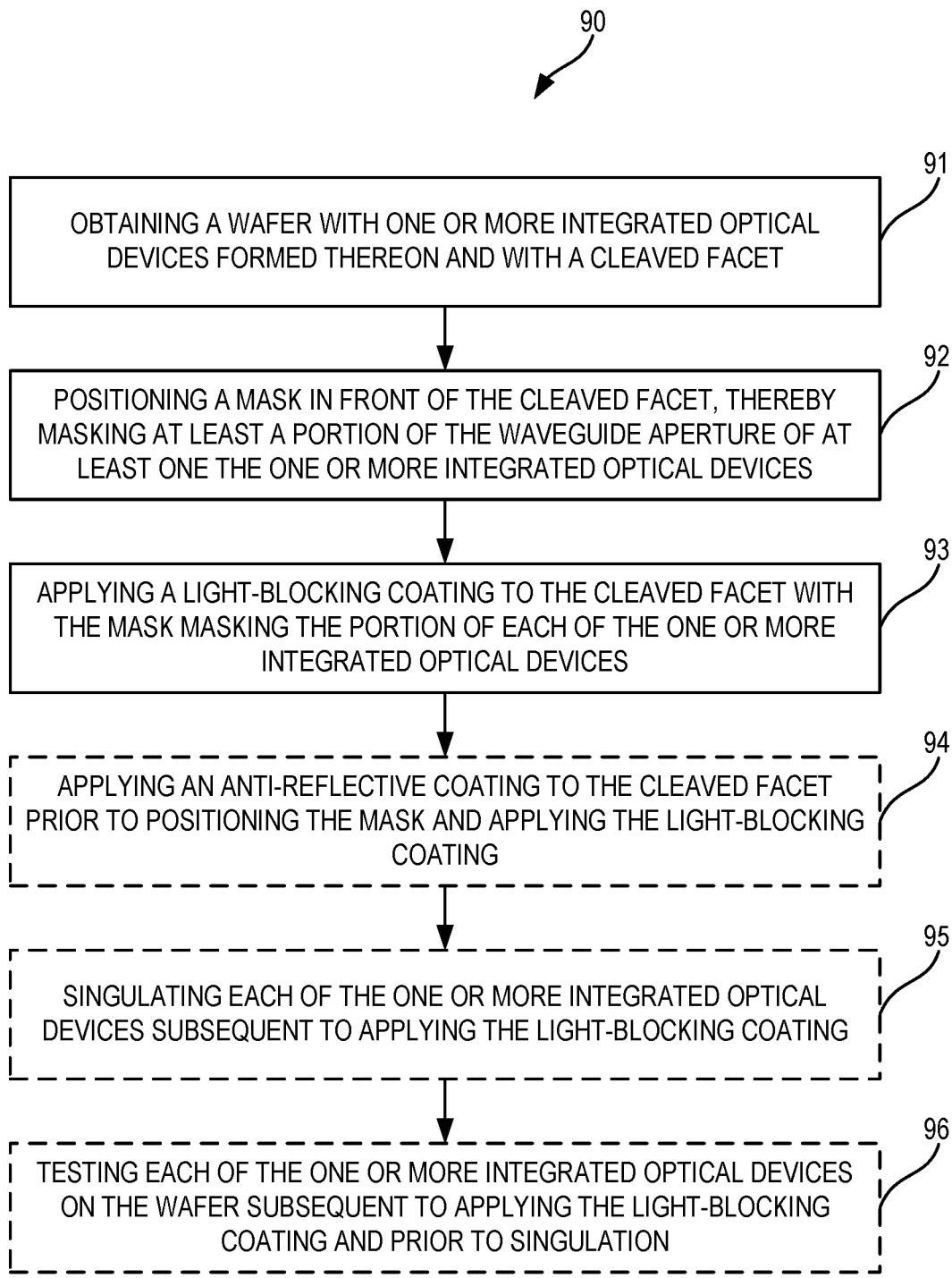
FIG. 9 is a flowchart of a process for manufacturing a waveguide aperture to block stray light from a facet of an integrated optical device.

FIG. 9 is a flowchart of a process 90 for manufacturing a waveguide aperture to block stray light from a facet of an integrated optical device. The process 90 includes obtaining a wafer 12 with one or more integrated optical devices 10 formed thereon and with a cleaved facet 18 (step 91); positioning a mask 50 in front of the cleaved facet 18, thereby masking at least a portion 54 of the waveguide aperture of at least one the one or more integrated optical devices 10 (step 92); and applying a light-blocking coating 52 to the cleaved facet 18 with the mask 50 masking the portion 54 of each of the one or more integrated optical devices 10 (step 93).

The process 90 can further include applying an anti-reflective coating 22 to the cleaved facet 18 prior to positioning the mask 50 and applying the light-blocking coating 52 (step 94). The process 90 can further include singulating (dicing) each of the one or more integrated optical devices 10 subsequent to applying the light-blocking coating 52 (step 95). The process 90 can further include testing each of the one or more integrated optical devices 10 on the wafer 12 subsequent to applying the light-blocking coating 52 and prior to singulation (step 96). Note, while the steps are shown in a particular order, those of ordinary skill in the art will recognize the steps may be performed in a different order and some of the steps may be omitted.

Applying the light-blocking coating 52 can utilize direct line-of-sight evaporation of a metal or dielectric in a vacuum system for depositing on the cleaved facet 18. Applying the light-blocking coating can utilize an ion beam assisted e-beam evaporator 70. The wafer 12 can be one of Indium Phosphide and Silicon, and the process 90 can further include applying an anti-reflective coating 22 to the cleaved facet 18 prior to positioning the mask 50 and applying the blocking coating 52, wherein the anti-reflective coating 22 gradually changes an index of refraction from the one of Indium Phosphide and Silicon to air. The wafer 12 is configured to rest on the mask 50 with masks 56 positioned over corresponding portions 54 on the cleaved facet 18.

In another embodiment, an integrated optical device is manufactured by a process including the steps of providing a wafer with one or more integrated optical devices formed thereon and with a cleaved facet; positioning a mask in front of the cleaved facet thereby masking a portion at the waveguide aperture of each of the one or more integrated optical devices; applying a blocking coating to the cleaved facet with the mask masking the portion of each of the one or more integrated optical devices; and singulating each of the one or more integrated optical devices subsequent to applying the light-blocking coating.

In a further embodiment, an integrated optical device 10 with a manufactured waveguide aperture to block stray light includes a semiconductor substrate crystalline slab; one or more layers on the semiconductor substrate crystalline slab forming a waveguide; a cleaved facet 18 on an end of the semiconductor substrate crystalline slab; and a blocking coating 52 on the cleaved facet 18 and excluded on a portion 54 of the cleaved facet 18 at or around a waveguide aperture.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for manufacturing a waveguide aperture to block stray light from a facet of an integrated optical device, the method comprising:
   obtaining a wafer with one or more integrated optical devices formed thereon and with a cleaved facet including the waveguide aperture of each of the one or more integrated optical devices thereon;
   positioning a temporary mask in front of the cleaved facet, thereby masking at least a portion of the waveguide aperture of each of the one or more integrated optical devices, the temporary mask adapted to mask at least the portion of the waveguide aperture; and
   applying a light-blocking coating to the cleaved facet with the temporary mask masking the portion of the waveguide aperture of each of the one or more integrated optical devices.

2. The method of claim 1, further comprising
   applying an anti-reflective coating to the cleaved facet prior to positioning the temporary mask and applying the light-blocking coating.

3. The method of claim 1, further comprising
   singulating each of the one or more integrated optical devices subsequent to applying the light-blocking coating.

4. The method of claim 3, further comprising
   testing each of the one or more integrated optical devices on the wafer subsequent to applying the light-blocking coating and prior to singulating each of the one or more integrated optical devices.

5. The method of claim 1, wherein applying the light-blocking coating utilizes evaporation of a metal or a dielectric on the cleaved facet using a vacuum system for depositing.

6. The method of claim 1, wherein applying the light-blocking coating utilizes an ion beam assisted e-beam evaporator.

7. The method of claim 1, wherein the wafer is one of Indium Phosphide and Silicon, and further comprising
   applying an anti-reflective coating to the cleaved facet prior to positioning the temporary mask and applying the light-blocking coating, wherein the anti-reflective coating changes an index of refraction from the one of Indium Phosphide and Silicon to air.

8. The method of claim 1, wherein during said positioning, the wafer is configured to rest on the temporary mask with portions of the temporary mask positioned over corresponding portions of the cleaved facet.

9. An integrated optical device manufactured by a process comprising the steps of:
   providing a wafer with one or more integrated optical devices formed thereon and with a cleaved facet including the waveguide aperture of each of the one or more integrated optical devices thereon;
   positioning a temporary mask in front of the cleaved facet, thereby masking at least a portion of the waveguide aperture of each of the one or more integrated optical device, the temporary mask adapted to mask at least the portion of the waveguide aperture;
   applying a light-blocking coating to the cleaved facet with the temporary mask masking the portion of the waveguide aperture of each of the integrated optical device; and
   singulating the wafer subsequent to applying the light-blocking coating.

10. The integrated optical device of the manufactured of claim 9, further comprising the steps of
    applying an anti-reflective coating to the cleaved facet prior to positioning the temporary mask and applying the light-blocking coating.

11. The integrated optical device of the manufactured of claim 9, further comprising the steps of
    testing the integrated optical device on the wafer subsequent to applying the light-blocking coating and prior to singulating each of the one or more integrated optical devices.

12. The integrated optical device of the manufactured of claim 9, wherein applying the light-blocking coating utilizes evaporation of a metal or a dielectric on the cleaved facet using a vacuum system for depositing.

13. The integrated optical device of the manufactured of claim 9, wherein applying the light-blocking coating utilizes an ion beam assisted e-beam evaporator.

14. The integrated optical device of the manufactured of claim 9, wherein the wafer is one of Indium Phosphide and Silicon, and further comprising the steps of
    applying an anti-reflective coating to the cleaved facet prior to positioning the temporary mask and applying the light-blocking coating, wherein the anti-reflective coating gradually changes an index of refraction from the one of Indium Phosphide and Silicon to air.

15. The integrated optical device of the manufactured of claim 9, wherein the wafer is configured to rest on the temporary mask with portions of the temporary mask positioned over corresponding portions on the cleaved facet.

* * * * *